(12) United States Patent
Wu

(10) Patent No.: US 8,300,335 B2
(45) Date of Patent: Oct. 30, 2012

(54) IMAGE DEVICE HAVING COLOR FILTER ARRAY

(75) Inventor: Yi-Tyng Wu, Chia-I (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 190 days.

(21) Appl. No.: 12/482,456

(22) Filed: Jun. 11, 2009

(65) Prior Publication Data

US 2010/0315734 A1 Dec. 16, 2010

(51) Int. Cl.
*G02B 5/22* (2006.01)
*G03B 21/14* (2006.01)
*H01L 31/062* (2012.01)

(52) U.S. Cl. ............ 359/891; 353/84; 257/294

(58) Field of Classification Search ............ 257/294
See application file for complete search history.

(56) References Cited

U.S. PATENT DOCUMENTS

| 4,928,162 | A | 5/1990 | Lesk et al. | |
|---|---|---|---|---|
| 6,608,358 | B1* | 8/2003 | Yamamoto | 257/431 |
| 2009/0032925 | A1* | 2/2009 | England | 257/680 |

* cited by examiner

*Primary Examiner* — Jade R Chwasz
(74) *Attorney, Agent, or Firm* — Winston Hsu; Scott Margo

(57) ABSTRACT

An image device includes a substrate having a die region defined thereon, a layout pattern positioned in the die region, and a color filter array including a plurality of color filters arranged in a matrix in the die region. The die region includes at least a die corner. The color filter array further includes at least a color filter array corner, and at least two apexes of the color filters arranged in the color filter array corner are separated from the corresponding layout pattern by a shortest distance.

12 Claims, 4 Drawing Sheets

IMAGE DEVICE HAVING COLOR FILTER ARRAY

BACKGROUND OF THE INVENTION

1. Field of the Invention

The present invention relates to a color filter array, and more particularly, to a color filter array capable of obtaining more effective die area.

2. Description of the Prior Art

With the trend toward digital age, the development of display technique and change of broadcasting method that adopts digital signals have made kinds of flat display such as liquid crystal display (LCD), field emission display (FED), organic light emitting diode (OLED), and plasma display panel (PDP) more preferable than conventional cathode ray tube (CRT).

Furthermore, since the micro-display is able to provide larger images than abovementioned displays are by optical method, the micro-display is more preferred on demand for displaying ultra large-sized images. The micro-display possesses another advantage of being easily applied in different displays such as LCD or OLED. For example, the micro-display applied in LCD is so-called micro LCD panel. The micro-display is divided into two categories: transmissive and reflective. The transmissive micro LCD panel is constructed on a glass substrate, and lights are transmitted through the display panel. The reflective micro LCD panel is constructed on a silicon substrate, therefore it is also known as liquid crystal on silicon display panel (LCoS) panel. The LCoS panel not only adopts the silicon wafer as the substrate but also replaces the thin film transistors (TFTs) with MOS transistors. Furthermore, the LCoS panel uses metal material serving as pixel electrode, thus light is reflected.

Both transmissive and reflective micro-displays need color filter array. Please refer to FIG. 1, which is a schematic drawing illustrating a conventional color filter array of a micro-display. As shown in FIG. 1, the color filter array 10 includes a plurality of color filters 12R, 12G, and 12B arranged in a rectangular matrix and positioned on a wafer 14, which is a glass wafer or a device wafer. No matter the rectangular color filter array 10 is positioned on the glass wafer or the device wafer, it is formed corresponding to a sub-pixel array formed on the device wafer. As shown in FIG. 1, the color filter array 10 is positioned in the center of a die 16. The dies 16 are separated from each other by a scribe line 18. And in the cutting process, the cutter is individualizing each die 16 along the scribe line 18 of the wafer 14.

Please still refer to FIG. 1. In the cutting process, internal stresses are unavoidably generated in the wafer 14, and thus cracks are formed. In order to protect the functional devices from the stresses, devices such as the sub-pixel units and the corresponding rectangular color filter array 10 are positioned in the center of the die 16. And as shown in FIG. 1 the sub-pixel units and the corresponding rectangular color filter array 10 are kept from the margins of the die 16 with a distance $d_1$. More particularly, a metal line 20 is positioned in the die corner to mark the die corner rule and is kept from the corner apex 16a by a distance $d_2$ in accordance with the topological layout rules (TLR). For instance, when size of the die 16 is larger than 100 square millimeters, the distance $d_2$ between the metal line 20 and the corner apex 16a is about 340 micrometer (μm); when size of the die 16 is smaller than 100 square millimeters, the distance $d_2$ between the metal line 20 and the corner apex 16a is about 125 μm. More important, the metal line 20 and both sides of the die corner have included angles of 45 degrees for further protecting the devices formed near the die corner. And four corner apexes 10a of the rectangular color filter array 10 are also separated from the metal line 20 by a distance $d_3$ in accordance with the TLR, which is larger than 25 μm.

As shown in FIG. 1, according to the TLR, the metal line 20 has to be separated from the corner apex 16a by the distance $d_2$, the metal line 20 and both sides of the die corner have the included angles of 45 degrees, and the corner apex 10a of the rectangular color filter array 10 has to be separated from the metal line 20 by the distance $d_3$. Because the abovementioned limitation in accordance with the corner rule and its specific shape limitation of the rectangular color filter array 10, the distance $d_1$ between the rectangular color filter array 10 and the margin of the die 16 is made larger than TLR. And thus size of the rectangular color filter array 10 and the corresponding sub-pixel array are reduced. In other words, the valuable space in the periphery of the die 16 is wasted. With the ever-present demands for high resolution and device size reduction, and progress in the semiconductor manufacturing method, the effective die area in one die is more valuable. Therefore, it is in need to provide a color filter array capable of obtaining more effective die area.

SUMMARY OF THE INVENTION

It is therefore a primary objective of the present invention to provide a color filter array capable of obtaining more effective die area.

According to the claimed invention, a color filter array is provided. The color filter array comprises a die region having at least a die corner defined thereon, a plurality of color filters arranged in a matrix in the die region, and at least a step-shaped corner corresponding to the die corner.

According to the claimed invention, an image device is further provided. The image device comprises a substrate having a die region defined thereon, the die region includes at least a die corner, a layout pattern positioned in the die region, and a color filter array including a plurality of color filters arranged in a matrix in the die region, the color filter array further includes at least a color filter array corner, and at least two apexes of the color filters arranged in the color filter array corner being separated from the corresponding layout patter by a shortest distance.

According to the color filter array provided by the present invention, the color filter array includes at least one color filter array corner that is adjustable, thus a distance between the color filter array and the die margin is reduced in accordance with TLR, and the effective die area is increased.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
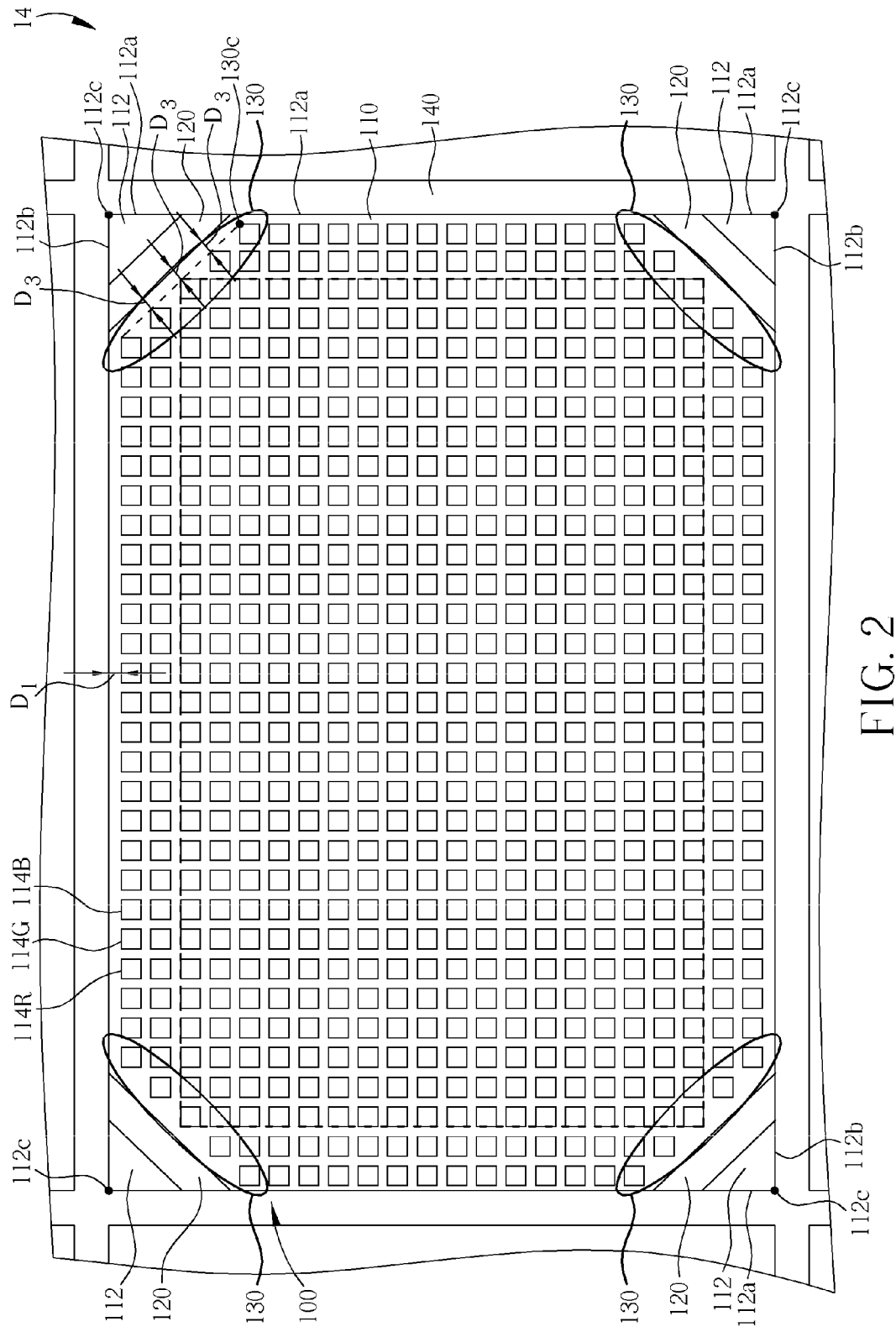
FIG. 2 is a schematic drawing of a color filter array provided by the first preferred embodiment of the present invention
Figure 3:
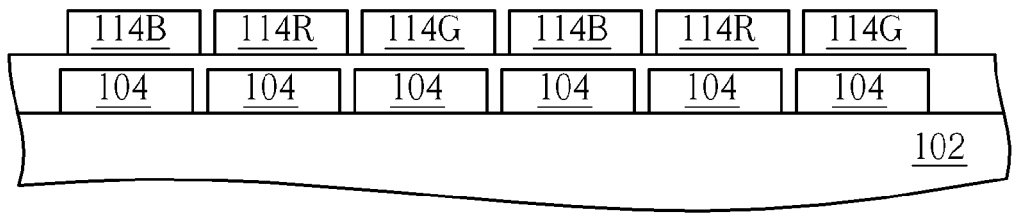
FIG. 3 is a cross-sectional drawing of the first preferred embodiment.
Figure 4:
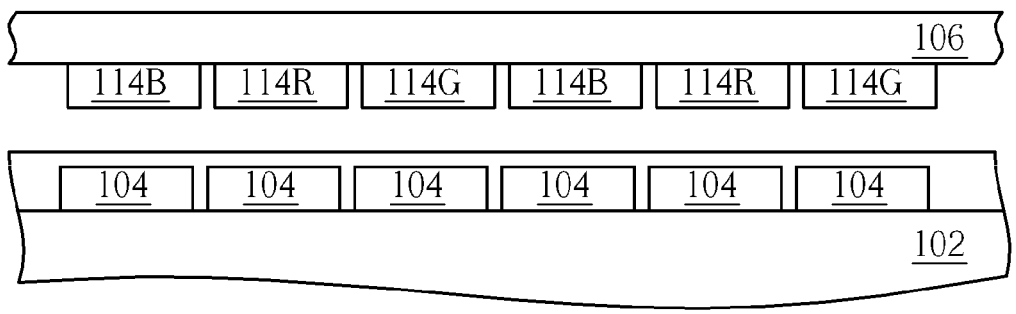
FIG. 4 is a cross-sectional drawing of a modification of the first preferred embodiment.

Please refer to FIGS. 2-4, FIG. 2 is a schematic drawing of a color filter array provided by the first preferred embodiment of the present invention, FIG. 3 is a cross-sectional drawing of the first preferred embodiment, and FIG. 4 is a cross-sectional drawing of a modification of the first preferred embodiment. The first preferred embodiment provides a color filter array 100 having a rectangular die region 110. As shown in FIG. 2, the die region 110 has four die corners 112, each of the die corners 112 is formed by two sides 112a, 112b of the die region 110 while the two sides 112a, 112b are encountered at a corner apex 112c. The color filter array 100 comprises a plurality of color filters 114R, 114G and 114B arranged in a matrix in the die region 110. As shown in FIG. 3, the die region 110 can be defined on a device wafer 102 having a plurality of sub-pixel units 104, and the color filters 114R and 114G, 114B are respectively corresponding to the sub-pixel units 104. Furthermore, the die region 110 can be defined on a glass wafer 106 as shown in FIG. 4, and the color filters 114R, 114G and 114B are respectively corresponding to a plurality of sub-pixel units 104 positioned on a device wafer 102.

Please refer to FIG. 2 again. The color filter array 100 provided by the present invention further comprises a plurality of layout patterns 120 respectively positioned in the die corners 112. In the first preferred embodiment, the layout patterns 120 are metal lines, but not limited to this. Each of the layout pattern 120 and the two sides 112a, 112b of the corresponding die corner 112 have included angles of 45 degrees. The layout pattern 120 is positioned to mark the corner rule and protect devices near the die corner 112.

The color filter array 100 provided by the first preferred embodiment further comprises at least a step-shaped corner 130. As shown FIG. 2, the color filter array 100 substantially in octagon has four step-shaped corners 130, and each of the step-shaped corners 130 is corresponding to one of the four die corners 112. Thus, the step-shaped corner 130 is also corresponding to the layout pattern 120 positioned in the die corner 112. In the first preferred embodiment, a line joining the apexes 130c of the color filters 114R, 114G and 114B arranged in the step-shaped corner 130 is parallel with the layout pattern 120, therefore the line joining the apexes 130c of the color filters 114R, 114G and 114B arranged in the step-shaped corner 130 and the two sides 112a, 112b of the step-shaped corner 130 also have included angles of 45 degrees.

It is well-known to those skilled in the art that the die region 110 defined on the device wafer or the glass wafer is encompassed by a scribe line 140. During the cutting process, the cutter is to cut the device wafer or the glass wafer along the scribe line 140 to obtain individual dies. In order to protect the color filter array 100 and its corresponding devices from adverse influences from stresses generated in the cutting process, the color filter array 100 and the corresponding devices are positioned in the center of the die region 110, and are separated from each side 112a, 112b of the die region 110 by a distance $D_1$. In the same concept, the layout pattern 120 is separated from the apex 112a of the die corner 112 by a distance $D_2$, and the color filter apex 130c of the color filter 114R, 114G or 114B arranged in the step-shaped corner 130 is separated from the layout pattern 120 by a distance $D_3$. The distances $D_1$ between the color filter array 110 and the sides 112a, 112b of the die, the distance $D_2$ between the layout pattern 12 and the apex 112a of the die corner 112, and the distance $D_3$ between the step-shaped corner 130 and the layout pattern 120 satisfy with the TLR. It is noteworthy that according to the first preferred embodiment, the line joining each apex 130a of the color filters 114R, 114G and 114B arranged in the step-shaped corner 130 is parallel with the layout pattern 120, and the joining line and the two sides 112a, 112b have included angles of 45 degrees as shown in FIG. 2. Therefore, every apex 130a of the color filter 114R, 114G and 114B arranged in the step-shaped corner 130 is separated from the layout pattern 120 by the distance $D_3$, which is the shortest distance satisfying with the TLR. In a modification of the first preferred embodiment, the line joining the apex 130a of the color filter 114R, 114G and 114B arranged in the step-shaped corner 130 can be substantially parallel with the layout pattern 120, which means at least two apexes of the color filters 114R, 114G or 114B arranged in the step-shaped corner 130 are separated from the corresponding layout patter by the distance $D_3$, which is the shortest distance satisfying with the TLR.

Figure 1:
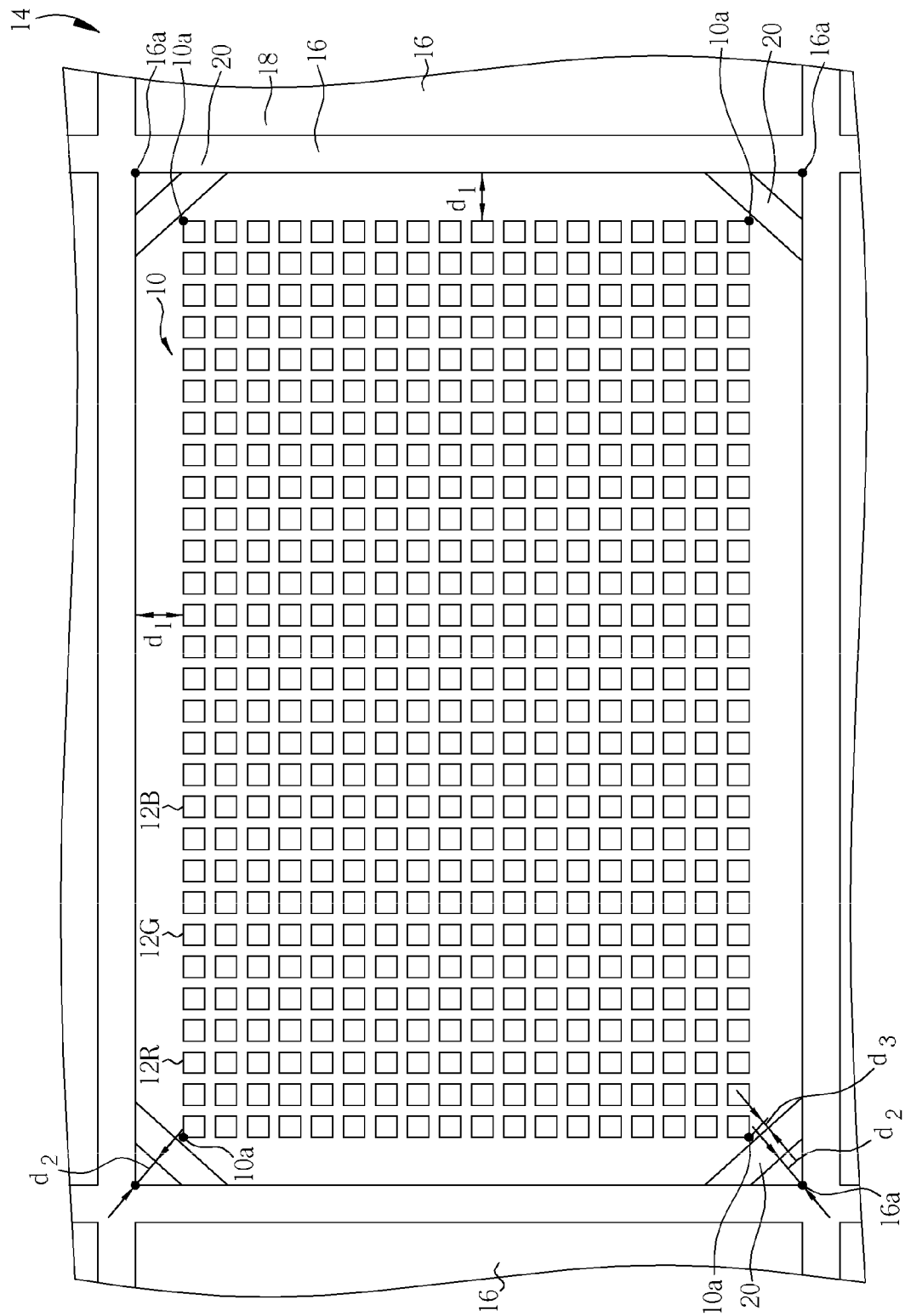
FIG. 1 is a schematic drawing illustrating a conventional color filter array of a micro-display.

Please also refer to the conventional rectangular color filter array designated by the dotted line in FIG. 2. Said rectangular color filter array designated by the dotted line is similar with the conventional rectangular color filter array 10 shown in FIG. 1. As shown in FIGS. 1 and 2, because the conventional color filter array 10 is rectangular, only one point, that is the apex 10a of the rectangular color filter array 10 can be separated from the layout pattern 120 by the smallest distance satisfying the TLR. And thus the distance $d_1$ between the rectangular color filter array 10 and the margin of the die 16 is larger than TLR. Different from the prior art, every step-shaped corner 130 of the color filter array 100 provided by the first preferred embodiment comprises at least two apexes 130a of the color filter array 100 separated from the corresponding layout pattern 120 by the shortest distance $D_3$ satisfying with the TLR. As shown in FIG. 2, the distance $D_1$ between the color filter array 100 and the two sides 112a, 112b of the die region 110 can be satisfied with TLR, and thus more effective die area is obtained for constructing more sub-pixel units. Consequently, resolution and process window are both improved.

Compared with the prior art, the color filter array 100 provided by the first preferred embodiment is substantially formed in octagon as shown in FIG. 2. It is observed that size of the color filter array 100 is larger than the conventional rectangular color filter array 10 designated by the dotted line. In other words, according to the first preferred embodiment, the provided color filter array 100 gains about 7% effective die area. On the demands for device size reduction and progress in semiconductor manufacturing methods, the color filter array 100 provided by the first preferred embodiment is able to increase valuable effective die area in the die region 110 and satisfy with the TLR.

Figure 5:
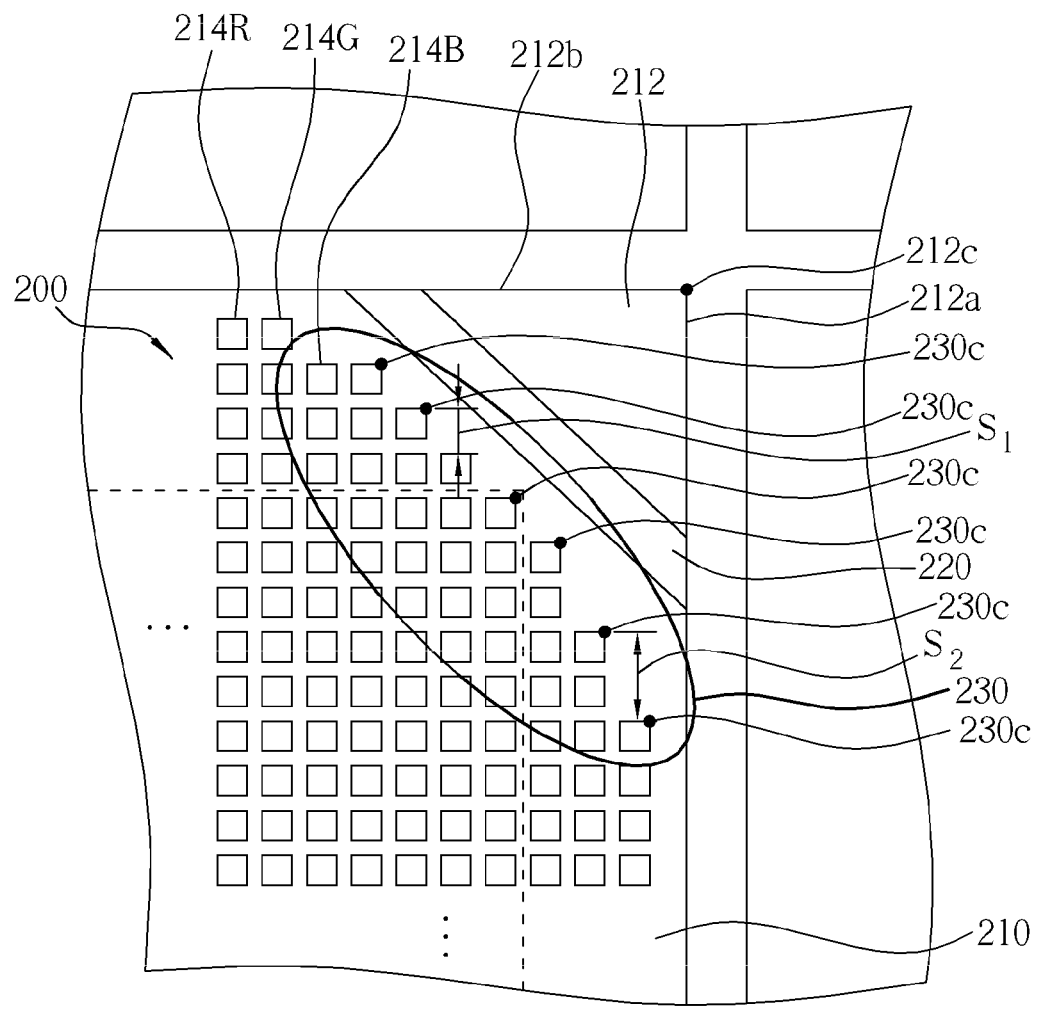
FIG. 5 is a schematic drawing of a portion of a color filter array provided by a second preferred embodiment of the present invention.

Please refer to FIG. 5, which is a schematic drawing of a portion of a color filter array provided by a second preferred embodiment of the present invention. According to the second preferred embodiment, the provided color filter array 200 comprises a rectangular die region 210 having four die corners 212. As shown in FIG. 5, the die corner 212 is defined by two sides 212a, 212b of the die region 210, and the sides 212a, 212b are encountered at an apex 212c. The color filter array 200 comprises a plurality of color filters 214R, 214G, 214B arranged in a matrix in the die region 210. Similar with the first preferred embodiment, the die region 210 can be defined on a device wafer or a glass wafer, therefore those details are omitted in the interest of brevity.

As shown in FIG. 5, the color filter array 200 provided by the second preferred embodiment further comprises a plurality of layout patterns 220 respectively positioned in the die corner 212. The layout pattern 220 exemplarily is a metal line, but not limited to this. The layout pattern 220 and the two sides 212a, 212b of the die corner 212 have included angles of 45 degrees. The layout pattern 220 is positioned to mark the corner rule and protect devices near the die corner 212.

The color filter array 200 provided by the second preferred embodiment further comprises a color filter array corner 230 as designated by the circle shown in FIG. 5. The color filter array corner 230 is positioned corresponding to the die corner 212, therefore it is also corresponding to the layout pattern 220 positioned in the die corner 212. In the second preferred embodiment, the color filter array corner 230 can be a step-shaped corner, but not limited to this. As shown in FIG. 5, the color filter array corner 230 includes at least a first riser height $S_1$ and a second riser height $S_2$, and the first riser height $S_1$ is different from the second riser height $S_2$. Accordingly, by arranging different rise heights, the slant of the color filter array corner 230 is adjusted, thus a line joining apexes 230c of the color filters 212R, 212G, 212C arranged in the color filter array corner 230 is a curve line. Compared with the conventional color filter array designated by the dotted line in FIG. 5, though the color filter array corner 230 provided by the second preferred embodiment includes only one apex of the color filters 212R, 212G, or 212C arranged in the color filter array corner 230 and the layout pattern 220 are separated by the smallest distance under TLR, effective die area and the amounts of the sub-pixel units formed therein are still increased by adjusting the slant of the color filter array corner 230.

According to the color filter array provided by the present invention, the color filter array includes at least adjustable color filter array corner, thus a distance between the color filter array and the die margin is reduced in a corner rule, and the effective die area is increased. Furthermore, the color filter array provided by the present invention is applied in the image device, and the image device not only can be an image sensor, but also can be an image display.

Those skilled in the art will readily observe that numerous modifications and alterations of the device and method may be made while retaining the teachings of the invention.

What is claimed is:

1. An image device comprising:
a substrate having a die region defined thereon, and the die region includes at least a die corner;
a layout pattern positioned in the die corner; and
a color filter array including a plurality of color filters arranged in a matrix in the die region, the color filters being arranged to form at least a step-shaped color filter array corner not contacted to the layout pattern, and a plurality of apexes of the color filters arranged in the step-shaped color filter array corner being substantially close to an edge of the layout pattern.

2. The image device of claim 1, wherein the layout pattern and both sides of the die corner have included angles of 45 degrees.

3. The image device of claim 1, wherein a line joining the apexes of the color filters arranged in the step-shaped color filter array corner is parallel with the layout pattern.

4. The image device of claim 1, wherein the substrate is a device wafer having a plurality of sub-pixel units formed therein.

5. The image device of claim 4, wherein the color filters are respectively corresponding to the sub-pixel units.

6. The image device of claim 1, wherein the substrate is a glass wafer.

7. The image device of claim 6, wherein the color filters are respectively corresponding to a plurality of sub-pixel units positioned on a device wafer.

8. The image device of claim 1, wherein the image device is an image sensor.

9. The image device of claim 1, wherein the image device is an image display.

10. The image device of claim 1, wherein the layout pattern further comprises a line-shaped layout pattern and two opposite ends of the line-shaped layout pattern contact two perpendicular sides of the die corner.

11. An image device comprising:
a substrate having a die region defined thereon, and the die region includes at least a die corner;
a metal layout pattern positioned in the die corner; and
a color filter array including a plurality of color filters arranged in a matrix in the die region, the color filter array further includes at least a color filter array corner not contacted to the metal layout pattern, and a plurality of apexes of the color filters arranged in the color filter array corner being substantially close to an edge of the metal layout pattern.

12. An image device comprising:
a substrate having a die region defined thereon, and the die region includes at least a die corner;
a layout pattern positioned in the die corner; and
a color filter array including a plurality of color filters arranged in a matrix in the die region, the color filters being arranged to form at least a color filter array corner not contacted to the layout pattern, a plurality of apexes of the color filters arranged in the color filter array corner being substantially close to an edge of the layout pattern, and a line joining the apexes of the color filters arranged in the color filter array corner is a curved line.

* * * * *